United States Patent [19]

Fesman et al.

[11] Patent Number: 4,794,126

[45] Date of Patent: Dec. 27, 1988

[54] REDUCTION OF DISCOLORATION IN FLAME RETARDED POLYURETHANE FOAMS

[75] Inventors: Gerald Fesman, Teaneck, N.J.; Barry Jacobs, Bethel, Conn.; Barbara Williams, New York, N.Y.

[73] Assignee: Akzo America Inc., New York, N.Y.

[21] Appl. No.: 188,988

[22] Filed: May 2, 1988

[51] Int. Cl.$^4$ .............................................. C08G 18/14
[52] U.S. Cl. ............................... 521/117; 252/182.13; 521/128; 521/163
[58] Field of Search .................. 252/182.13; 521/117, 521/128, 163

[56] References Cited

U.S. PATENT DOCUMENTS 3,637,573  1/1972  Mine et al. ............................. 260/37
3,798,184  3/1974  Cuscurida et al. .................... 260/2.5
4,130,513  12/1978  Reale et al. .......................... 521/107

Primary Examiner—Maurice J. Welsh
Attorney, Agent, or Firm—Richard P. Fennelly; Louis A. Morris

[57] ABSTRACT

Polyurethane foams containing halogenated phosphorus-based flame retardants are protected from scorching by the incorporation therein of an anti-scorch package which comprises a diaryl arylenediamine, the reaction product of a diarylamine and a lower alkyl ketone, and a hindered phenol.

12 Claims, No Drawings

REDUCTION OF DISCOLORATION IN FLAME RETARDED POLYURETHANE FOAMS

BACKGROUND OF THE INVENTION

1. Field of the Invention

The present invention relates to reduction of discoloration in flame retarded polyurethane foams.

2. Description of the Prior Art

In U.S. Pat. No. 4,130,513, a mixture of diphenyl p-phenylenediamine and the reaction product of diphenylamine and acetone is described as an additive package to prevent the discoloration of polyurethane foams which are rendered flame retardant by use of a halogenated phosphorus flame retardant. The instant invention concerns itself with an improvement in the general type of anti-scorch, two-component package described in the aforementioned U.S. Pat. No. 4,130,513.

SUMMARY OF THE PRESENT INVENTION

The instant invention relates to a three-component, anti-scorch package for polyurethane foams which have been rendered flame retardant by the use of halogenated phosphorus-based flame retardants. The package comprises a diaryl arylenediamine, the reaction product of a diarylamine and a lower alkyl ketone, and, as a novel third component, a hindered phenol.

DETAILED DESCRIPTION OF THE PRESENT INVENTION

The present invention is concerned with low density polyurethane foams that have been rendered flame retardant by the use of a halogenated phosphorus-based flame retardant and, more particularly, to the reduction of scorching when the curing operation is performed in the presence of such flame retardants.

The flame retardant compositions which can be used in the low density polyurethane foams include such halogenated phosphorus-based flame retardants as poly(haloethylethyleneoxy) phosphoric acid esters, mixtures of such esters with other flame retardants, and such other flame retardants as the tris(haloalkyl)phosphates, such as tris(dibromopropyl)phosphate, tris(beta-chloroethyl)phosphate, and tris(beta-chloropropyl)phosphate, among others. Generally speaking, such halogenated, phosphorus-based flame retardants are employed in a flame retardant effective amount, generally from about 3% to about 20% by weight of the polyol used in the foam formulation.

The polyurethane foam formulation which can be used in conjunction with the present invention includes the numerous conventional foam formulations for such low density polyurethane foams. The selection of various ingredients and process conditions for making such foams can easily be determined by a person of ordinary skill in the art.

The three-component, anti-scorch package which is the subject of the present invention comprises the following components:

(a) a diaryl arylenediamine;
(b) the reaction product of a diarylamine and a lower alkyl ketone, such as acetone; and
(c) as a novel third component, a hindered phenol.

The diaryl arylenediamines which are deemed useful in accordance with the present invention include those of the formula $Ar(NHAr)_2$, where Ar is a substituted or unsubstituted aryl group. A representative example of a suitable diaryl arylenediamine which can be used in accordance with the present invention is diphenyl para-phenylenediamine, which is a preferred additive. Generally speaking, the amount of such component can range anywhere from about 20% to about 40% by weight of the three-component anti-scorch package.

The second component of the anti-scorch package of the present invention is a reaction product of a diarylamine and a lower alkyl ketone, such as acetone. A preferred reaction product from this class of compounds is the reaction product of diphenylamine and acetone which is described in U.S. Pat. No. 3,798,184 as a stabilizer for polyurethane compositions against dry-heat degradation. Generally speaking, the amount of this component which can be used in the three-component, anti-scorch package of the present invention ranges from about 20% to about 40% by weight of the package.

The third, and final, component for the anti-scorch package of the present invention comprises a hindered phenol. In order to insure good processability for the foam formulation, the hindered phenol (as well as the two previously mentioned anti-scorch components) should be readily soluble in the foam formulation components. For example, if the scorch inhibitor package of the present invention is intended to be marketed in combination with the flame retardant, it should be soluble in that component for best results. Liquid or readily dissolvable solid phenols are useful.

This class of compound is known and includes phenol compounds having a plurality of substituents, e.g., of the alkyl-type. In order to insure solubility in the foam compositions, the alkyl groups should not be so bulky as to inhibit solubility. Polar substituents, if present, may tend to be acceptable, since they likely will not detract from the preferred solubility desired. For example, such phenols include compounds having from 2 to 4 alkyl substituents, particularly those that have some degree of bulk to them. Branched alkyl groups at the ortho positions serve to give the desired degree of stearic hindrance. Included are such groups as secondary-butyl and tertiary-butyl. A representative phenol from this class of compound is a tributylated phenol such as 3,6'-di-tert-butyl-4-sec-butyl phenol. Generally speaking, the weight amount of hindered phenol which can be used in the anti-scorch package of the present invention can vary from about 20% to about 40% by weight of the three-component package. It has been found that the additional presence of the hindered phenol enables the type of two-component package shown in U.S. Pat. No. 4,130,513 to function more effectively as an anti-scorch composition. Generally speaking, the weight amount of such anti-scorch composition in the polyurethane foam formulation can range anywhere from about 0.3% to about 7.5% by weight of the polyol used in the formulation.

The following Examples illustrate certain embodiments of the present invention, but should not be construed in a limiting sense.

EXAMPLE

The following general type of polyurethane foam formulation was prepared:

| Ingredient | Parts by Weight |
| --- | --- |
| Polyether Polyol (3000 mw) (NIAX 16-56 brand) | 100 |
| Halogenated Phosphoric Acid | 15.0 |

-continued

| Ingredient | Parts by Weight |
|---|---|
| Ester Flame Retardant | |
| Tolylene Diisocyanate | 63.2 |
| Water | 5.0 |
| Silicone Surfactant Stabilizer (L 5740 brand) | 1.1 |
| Diazobicyclo-(2,2,2)-octane Catalyst | 0.3 |
| N—ethylmorpholine Catalyst | 0.2 |
| Stannous Octoate Catalyst | 0.4 |

The formulation was combined with the various types of additives mentioned in the Table given below and poured into a 20.32 cm×20.32 cm×12.70 cm box and allowed to rise freely. The foam was then placed in an AMANA TOUCHMATIC RADARANGE microwave oven and heaed for 105 seconds. The foam was removed and allowed to cool for 30 minutes. The foam bun was then sliced in the center perpendicular to the direction of rise and a 2.54 cm thick slice was cut from the bun. A 5.08 cm by 5.08 cm sample from the slice was removed for foam evaluation.

The foam was evaluated, as more fully described in U.S. Pat. No. 4,477,600 (which is incorporated herein by reference), using a Pacific Scientific Spectrogard Colorimeter (XL 835 designation) to give a numerical rating to three color characteristics compared to a foam prepared without flame retardant. The color difference was calculated as more fully described in A Rapid Predictive Test for Urethane Foam Scorch, by Michael J. Reale and Barry A. Jacobs in Journal of Cellular Plastics, November/December 1979 (which is also incorporated herein by reference). A smaller color difference value indicates less discoloration and is indicative of superior performance.

The Table sets forth the data. The numbers below anti-scorch additives A-D refers to the gram amounts present:

TABLE

| Flame Retardant Type* | A | B | C | D | Color Difference |
|---|---|---|---|---|---|
| 1** | — | — | — | — | 34.9 |
| 1** | 0.75 | 0.75 | — | — | 28.6 |
| 1 | 0.50 | 0.50 | 0.50 | — | 27.9 |
| 1** | — | — | 1.50 | — | 34.0 |
| 1 | 0.50 | 0.50 | — | 0.50 | 32.6 |
| 2** | — | — | — | — | 19.4 |
| 2 | 0.50 | 0.50 | 0.50 | — | 14.1 |
| 3** | — | — | — | — | 44.2 |
| 3 | 0.50 | 0.50 | 0.50 | — | 24.9 |
| 4** | — | — | — | — | 34.6 |
| 4 | 0.50 | 0.50 | 0.50 | — | 16.3 |

*The flame retardant was present at 15 grams in all cases. Type 1 was tetrachloroethyl diethyleneglycol bisphosphate. The type 2 was tris(dichloropropyl) phosphate (FYROL FR-2 brand). Type 3 was the oxydi-1,2-ethanediaryl-tetrakis-(1,3-dichloro-2-propyl ester of phosphoric acid. Type 4 was the oxydi-1,2-ethanediyl-tetrakis (2-chloro-1-methylethyl) ester of phosphoric acid.

In the Table above the various scorch inhibitors are:
A=diphenyl p-phenylene diamine (NAUGARD J brand);
B=the reaction product of diphenylamine and acetone (AMINOX brand);
C=2,6-di-tert-butyl-4-sec-butyl phenol (VANOX 1320 brand); and
D=2,4-bis(n-octylthio)-6-(4-hydroxy-3,5-di-tert-butylanilino)-1,3,5-triazine (IRGANOX 565 brand).
**=not part of the present invention.

The foregoing Examples are included herein to illustrate certain embodiments of the present invention and should not, therefore, be construed in a limiting sense. The scope of protection that is sought is set forth in the claims which follow.

We claim:

1. An anti-scorch composition designed to be used to reduce scorch in polyurethane foams containing a halogenated phosphorus-based flame retardant, which comprises:
   (a) a diaryl arylenediamine compound;
   (b) the reaction product of a diarylamine and a lower alkyl ketone; and
   (c) a hindered phenol.

2. A composition as claimed in claim 1 wherein the diaryl arylenediamine compound is present at from about 20% to about 40% by weight of (a), (b) and (c), the reaction product is present at from about 20% to about 40%, by weight of (a), (b) and (c), and the hindered phenol is present at from about 20% to about 40%, by weight of (a), (b) and (c).

3. A composition as claimed in claim 1 wherein the diaryl arylenediamine is diphenyl para-phenylenediamine.

4. A composition as claimed in claim 2 wherein the diaryl arylenediamine is diphenyl para-phenylenediamine.

5. A composition as claimed in claim 1 wherein the reaction product is a reaction product of diarylamine and acetone.

6. A composition as claimed in claim 2 wherein the reaction product is a reaction product of diarylamine and acetone.

7. A composition as claimed in claim 1 wherein the hindered phenol is 3,6'-di-tert-butyl-4-sec butyl phenol.

8. A composition as claimed in claim 2 wherein the hindered phenol is 3,6'-di-tert-butyl-4-sec butyl phenol.

9. A polyurethane foam containing a halogenated phosphorus-based flame retardant which contains an effective amount for reduced scorching of the composition of claim 1.

10. A polyurethane foam containing a halogenated phosphorus-based flame retardant which contains an effective amount for reduced scorching of the composition of claim 2.

11. A polyurethane foam as claimed in claim 9 wherein the effective amount ranges from about 0.3% to about 7.5% by weight of polyol used in making the foam.

12. A polyurethane foam as claimed in claim 10 wherein the effective amount ranges from about 0.3% to bout 7.5%, by weight of polyol used in making the foam.

* * * * *